United States Patent [19]
von Wedel et al.

[11] Patent Number: 5,112,587
[45] Date of Patent: May 12, 1992

[54] METHOD FOR THE DENITRATION OF WASTE GASES WITH OBTENTION OF HNO₃

[75] Inventors: Wedigo von Wedel, Offenbach; Elke Senff, Langenselbold; Oswald Helmling, Hasselroth, all of Fed. Rep. of Germany

[73] Assignee: Degussa AG, Frankfurt am Main, Fed. Rep. of Germany

[21] Appl. No.: 696,011

[22] Filed: May 6, 1991

[30] Foreign Application Priority Data

May 12, 1990 [DE] Fed. Rep. of Germany ....... 4015284

[51] Int. Cl.⁵ ............... C01B 21/00; C01B 21/38; C01B 21/40; B01J 8/00
[52] U.S. Cl. ............................ 423/235; 423/239; 423/390; 423/393
[58] Field of Search ............ 423/390, 393, 235, 239, 423/239 A, 235 D

[56] References Cited

U.S. PATENT DOCUMENTS

| | | | |
|---|---|---|---|
| 4,341,747 | 7/1982 | Downey | 423/393 |
| 4,367,204 | 1/1983 | Klopp et al. | 423/393 |

FOREIGN PATENT DOCUMENTS

| | | | |
|---|---|---|---|
| 2537061 | 3/1976 | Fed. Rep. of Germany. | |
| 2813370 | 10/1978 | Fed. Rep. of Germany | 423/390 |
| 673409 | 3/1990 | Switzerland. | |

*Primary Examiner*—Gregory A. Heller
*Attorney, Agent, or Firm*—Beveridge, DeGrandi & Weilacher

[57] ABSTRACT

A method for the removal of nitrogen oxides from waste gases and for obtaining nitric acid is described. The waste gas is charged with the required amount of hydrogen peroxide, converted into the gas phase, and the gas mixture is reacted on a solid catalyst to hydrogen nitrate, which is either withdrawn for further use or is converted into nitric acid either by condensation or by scrubbing with water. The method permits the removal of $NO_x$ at low concentrations below 2000 ppm with efficiencies above 90%.

18 Claims, 1 Drawing Sheet

METHOD FOR THE DENITRATION OF WASTE GASES WITH OBTENTION OF HNO₃

BACKGROUND OF INVENTION

The present invention relates to a method for the removal of nitrogen oxides, especially of NO and/or NO₂ from waste gases of many kinds, especially waste gases obtained from industrial furnaces and from combustion firing systems. The present invention further relates to a method for the recovery of nitric acid.

For reasons of environmental protection, effective methods for an extensive removal of nitrogen oxides from industrial systems, e.g. the production of fertilizers or the processing of metals, but also from combustion furnaces systems of varied types, including power plants and garbage incineration plants, are becoming more and more important. The value of these methods is to be judged on the basis of the extent to which the pollutants can be removed and whether harmless conversion products are created in those methods or whether utilizable by-products, that is, valuable substances, are formed.

Methods have already been described by which waste gases of varied origins containing nitrogen oxide were subjected to a gas scrubbing operation for the physical or chemical absorption of the nitrogen oxides. Since primarily nitrogen dioxide, NO₂, and nitrogen monoxide, NO, are contained in such waste gases and since the latter is especially difficult to absorb in aqueous media, the suggestion has been made in DE-AS 25 37 061 that the NO be catalytically oxidized before the gas scrubbing.

The nitrogen dioxide formed can be removed from the waste gas basically by means of absorption in water. However, a sufficient reduction of its concentration can not be achieved in a satisfactory manner in the case of low concentration waste gases (e.g. <2000 ppm NO₂) when using the conventional apparatus in practice in large-scale purification of waste gases. This is due to the economically imposed conditions limiting the dwell times (e.g. to values below approximately 2 sec.) as a consequence of the rate of dissolution, which is still too low.

Even a reaction of dissolved nitrogen dioxide by means of a chemical reaction with oxidation agents, alkali metal hydroxide or ammonia, which are added to the absorption agent with the intention of achieving an acceleration of the absorption by means of a spontaneous removal of dissolved nitrogen dioxide from the solution equilibrium, has not resulted in the desired success. In spite of the addition of NaClO₂ as an oxidation agent, rates of absorption which were barely greater than 50% were able to be achieved under industrial conditions, that is, in the case of $NO_x$ amounts of $Y_{NOx} \leq 1000$ ppm, dwell times in a waste-gas scrubber of <1 sec. and temperatures >40° C. An aggravating circumstance is the fact that, at least in the case of combustion waste gases, alkaline scrubbing solutions can not be economically used because of the alkali consumption by CO₂. Even the addition of solubilizers (metal-chelate complexes) was not able to improve oxidative gas scrubbing to any considerable degree.

The currently dominant method for the denitration of waste gases relies on the reduction of nitrogen oxides to nitrogen and water. This can take place either catalytically (SCR) or non catalytically by means of the use of high temperatures (SNCR). Ammonia is usually used as the reduction agent in both methods. However, SCR and SNCR systems for the denitration of waste gases have the disadvantage of a greater or lesser ammonia leakage.

There are other disadvantages in addition to the ammonia leakage. There is the necessity of keeping in reserve rather large amounts of liquid ammonia, which is associated with a potential danger for the surrounding population. The SCR method requires relatively expensive catalysts. Since both methods are carried out at an elevated temperature, the accumulating waste gases, which are cooler, must be preheated. The harmless compounds nitrogen and water are produced as reaction products; they do not constitute useful substances which can be used further.

An attempt has also been made to treat nitrogen-oxide-containing waste gases with aqueous solutions of hydrogen peroxide in a scrubbing method. This method has also not resulted in the past in any palpable success since the degrees of denitration achievable in the case of waste gases containing a low concentration of nitrogen oxides and requiring rather long scrubbing times were not even approximately sufficient.

An object of the invention is to provide a method for the purification of nitrogen-oxide containing waste gases, especially those with low concentrations of $NO_x$, that is, concentrations <1000 ppm $NO_x$, which permits degrees of denitration above 90% even at low temperatures and drastically reduced dwell times and in which the nitrogen oxides can be converted practically completely into a useful substance, namely, to nitric acid.

SUMMARY OF THE INVENTION

In attaining the above as well as other objects, one feature of the invention resides in a method for the removal of nitrogen oxides, especially of NO and/or NO₂ from waste gases, especially from waste gases from industrial furnaces and from combustion systems, with the recovery of nitric acid. A feature of the method of the invention resides in first determining the content of nitrogen oxides of the waste gas and then charging the waste gas with a solution of hydrogen peroxide converted into the gaseous state in an amount which is adapted to the amount of nitrogen oxides to be removed.

Another feature of the invention is to determine the amount of hydrogen peroxide to be stoichiometrically sufficient for the reaction equations:

$$2\ NO + 3\ H_2O_2 \rightarrow 2\ HNO_3 + 2\ H_2O$$

and $$2\ NO_2 + H_2O_2 \rightarrow 2\ HNO_3$$

In an optional embodiment, the hydrogen peroxide is present in excess.

In carrying out the invention, the gaseous mixture is reacted either at its temperature or preferably with adjustment of the temperature of 20°–120° C. on a solid substance as catalyst. The catalyst can adsorb at least H₂O₂ because of its increased outer surface area and/or because of an existing inner surface area. However, the catalyst does not decompose the hydrogen peroxide, or does not decompose it excessively. The reacted gaseous mixture so obtained is then withdrawn for further processing. Alternatively, the amount of gaseous HNO₃/-

$H_2O$ mixture formed in the reaction and present in the gaseous mixture is processed further to form nitric acid in accordance with known procedures such as condensation or scrubbing with water. The nitric acid is then recovered as an economically useful product of the waste gas purification system.

The test results show that that a part of the NO present in the gas current is converted by a side reaction into $NO_2$ according to the reaction:

$$NO + H_2O_2 \rightarrow NO_2 + H_2O.$$

Consequently, not only is $HNO_3$ formed but also, to the extent that NO is present, $NO_2$ can result as a reaction product from this reaction. However, if a sufficient supply of $H_2O_2$ is kept in reserve, $NO_2$ is oxidized further to $HNO_3$.

The reaction can be carried out in a fluidized bed or in a fixed bed of the solid catalyst; however, a fluidized bed is preferred.

The use of the solid catalyst in a fluidized bed permits a smaller particle size and an improved conversion of substance and heat between the gaseous phase and the catalyst. A smaller particle size for the catalyst is advantageous in the given, rapid chemical reaction since a better utilization of the catalyst is obtainable because of shorter diffusion paths and because of the enlarged outer surface area. In addition, the reaction heat is more efficiently removed in a fluidized bed than in a fixed bed.

The use of a fixed-bed reactor is recommended when using a less abrasion-resistant catalyst and in instances in which only a partial denitration with low pressure loss is necessary.

Experimentally, a degree of denitration of above 70% at temperatures between 40° C. and 100° C. was able to be realized in the past (at 750 ppm $NO_x$) in a fixed-bed reactor at a space velocity of 66.7 $m^3/h/kg$.

The selection of the solid catalyst is not critical because any finely divided and/or porous and/or rough-walled solid substances can be used for purposes of the invention to the extent that the catalyst does not decompose hydrogen peroxide, or does not excessively decompose it and, of course, is chemically resistant to the reactants and reaction products.

The proven suitability of a plurality of substances that are conventionally used for catalytic carriers or adsorbents shows that the catalyst in the process of the invention acts practically only by means of its surface area characteristics, which is elevated in relation to the walls of customary reaction containers.

The substance groups designated in the following list with a), b) and c), wherein the effectiveness decreases from a) to c), were found to be suitable as catalysts in an experiment carrying out the present invention. Substances which proved to be totally unsuitable were so-called reflex beads of glass (Belletini company) or ion-exchange resins totally free of pores (e.g. Lewatit S 100, order No. 2-100, Bayer) or manganese(IV)-oxide in powder form, which, as is known, decomposes hydrogen peroxide particularly rapidly.

The substances which were tested and found to be suitable are all available at low cost:

a) Silica gels, precipitated silicas, pyrogenic silicas, optionally in hydrophobic form in each instance;
Wide-pore or medium-pore natural or synthetic zeolites;
Ion-exchange resins with porous structure;
Phyllosilicates;
Diatomaceous earth;
Aluminum oxide;
Titanium dioxide;
Natural or synthetic layered silicates; and
Activated carbons;
but also
b) Microglass spheres;
Quartz sand;
Calcium sulfate hydrate powder; and
narrow-pore zeolites
and even
c) Builder's sand; and
Iron oxide.

The catalysts which were tested in more detail in experiments are characterized more specifically in the following:

Silica gel 60, particle size 0.2–0.5 mm, specific surface approximately 450–500 $M^2/g$ (item 7733 of the Merck company, Darmstadt);
Silica gel 60 H, silanized (item 7761 of the Merck company, Darmstadt);
Wide-pore 12-ring zeolite, mordenite (pore width 6.7×7.0 Å, modulus 18 (Si/Al=9));
Wide-pore 12-ring zeolite, dealuminized y-zeolite (pore width 7.4 Å, modulus 200 (Si/Al=100));
Wide-pore 12-ring zeolite, $NH_4$-y zeolite (pore width 7.4 Å, modulus 5 (Si/Al 2.5)) as well as
Medium-pore 10- ring zeolite, ZSM-5 (pore width 5.4–5.6 Å, modulus 42 (Si/Al 21));
Ion-exchange resin, macroporous, sharply acidic (Amberlyst 15, item 15635 of the Merck company, Darmstadt); diatomaceous earth, annealed - commercial product;
Aluminum oxide 90 (item 1078 of the Merck company, Darmstadt);
Titanium dioxide (item 812 of the Merck company, Darmstadt);
Calcium silicate hydrate, contained in CAT-SAN—hygienic (sanitary) litter of the Effem company, Verden/Aller; and
Activated carbon with a specific surface of 1270 $m^2/g$ and an average pore diameter of 160 μm (active carbon carrier 120, Degussa, Frankfurt).

All these substances are excellent catalysts.

The following can be used with a medium action:
Glass spheres (window glass, particle size 1–40 μm) (microglass spheres type: 3000 of the Potters-Ballotini GmbH company, Kirchheimbolanden);
Quartz sand 0.4–0.6 mm particle size (screen size) (type P, Busch company, Schnaittenbach);
Precipitated powdery calcium sulfate (item 2160, Merck company, Darmstadt); and
Narrow-pore zeolite (Na-A, pore diameter 4 Å, modulus 2 (Si/Al=1)).

The following can be used with a weak action:
Builder's sand, particle size 0.05–0.6 mm; and
Iron(III)oxide powder.

DETAILED DESCRIPTION OF INVENTION

Figure 1:
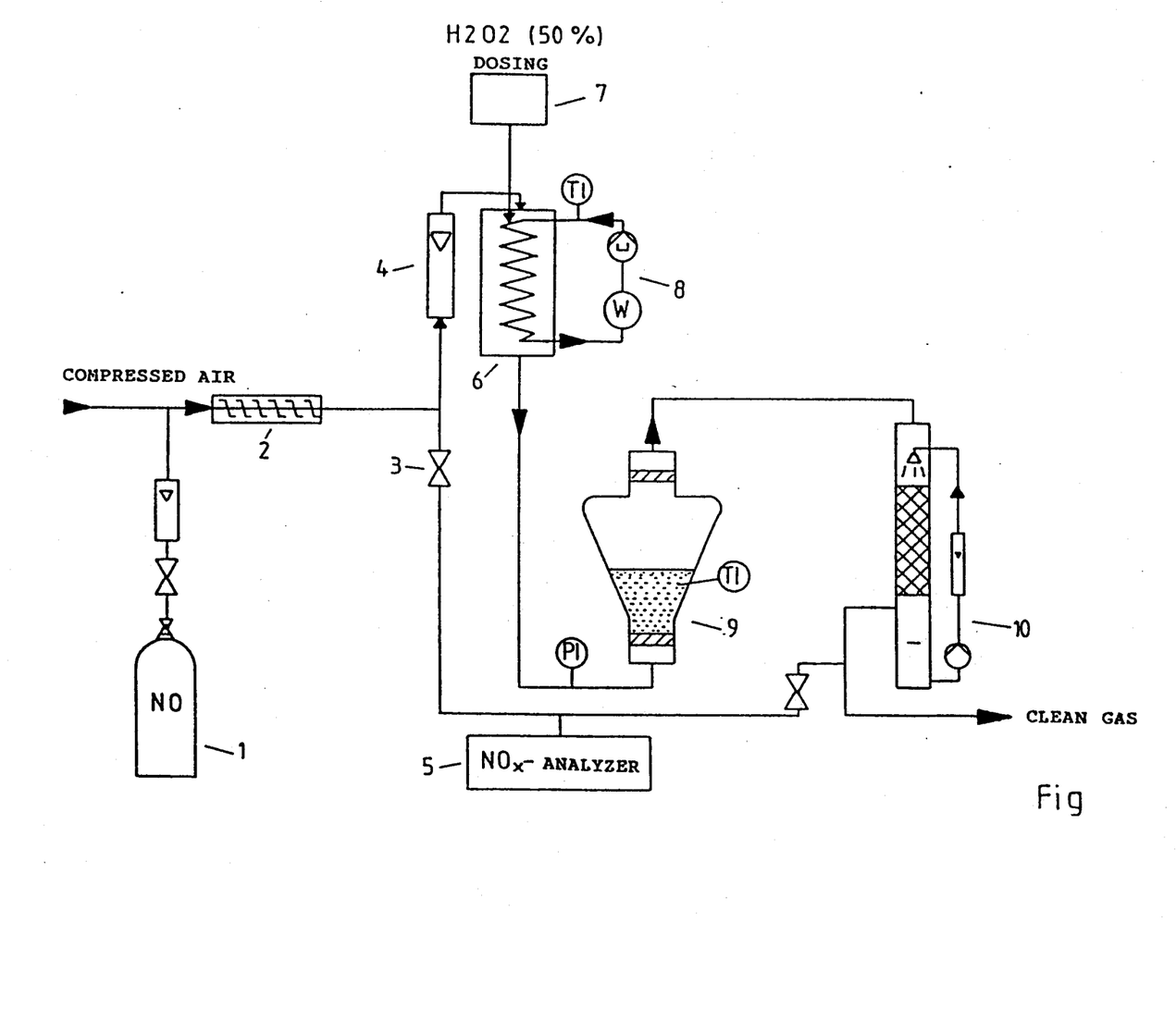
The drawing illustrates the flow chart of the method of carrying out the present invention.

The FIGURE represents a schematic flow diagram of the operation of the experiment described herein in the examples. A source of NO gas in a container (1) is conducted through a valve equipped pipe line (1A) to a mixing device 2 which is also charged with a source of pressurized air (1B). The composite gaseous mixture is then conveyed through flow meter (4) to the falling film evaporator (6).

A source of $H_2O_2$ is located in tank (7) located above the falling film evaporator (6).

For analyzing the model gas, valve (3) is opened and the gas mixture flows to a commercial $NO_x$ analyzer (5).

From falling film evaporator (6), the gas —$H_2O_2$ stream flows into fluidized bed reactor (9) and from there to filler column (10).

According to a preferred embodiment of the method of the invention, aqueous hydrogen peroxide in a concentration up to 85% by weight in the required measured amount for evaporation is brought into a stream of waste gas, optionally by means of spraying or atomizing. Alternatively, the evaporation is performed by means of an external evaporator or an evaporator arranged in the stream of waste gas, preferably a falling-film evaporator, with adjustment of the evaporation amounts by way of the amount of $H_2O_2$ solution supplied to the evaporator.

A single fluid or two-fluid nozzle can be used for spraying, through which the hydrogen-peroxide solution is fed directly into the $NO_x$-containing gas stream to be treated and is converted there into the vapor phase. An atomization takes place preferably with a suitable commercial ultrasonic atomizer.

If the hydrogen peroxide solution is vaporized using a falling-film evaporator, then either the gas vapor stream to be treated can flow through the evaporator as the receiver phase for the hydrogen peroxide to be evaporated or an auxiliary gas stream can flow through it as receiver phase. The latter is then mixed, after being charged with hydrogen peroxide solution, with the gaseous stream to be treated and supplied to the catalytic component.

Hydrogen peroxide solution is supplied in a known flow amount in a continuous manner by a dosing pump from a thin hose or tube onto the upper part of the heated substance-exchange surface of the evaporator. It flows downward by gravity, during which time a continuous and complete vaporization takes place.

An especially simple embodiment for an externally situated falling-film evaporator through which a stream of auxiliary gas flows consists of a filler column onto the upper end of which the hydrogen peroxide solution is located in a storage container and through which warm carrier air flows from below with the aid of a hot-air blower. The evaporation can also be carried out by dosing the hydrogen peroxide solution onto an evaporation surface around which the gas to be treated flows and which is sufficiently heated by its thermal content for a complete vaporization. This can be realized, for example, by means of a packing of glass spheres in the gas stream, onto which the $H_2O_2$ solution is dripped or sprayed.

In order to increase the total effectiveness of the method of the invention as regards the removal of nitrogen oxide, the gas mixture reacted on the catalyst can be catalytically reacted again, optionally after another charging with $H_2O_2$, and further optionally after a sorptive lowering or removal of the $HNO_3$ contained in the gas mixture, for a further reduction of nitrogen oxides which are still contained in gas stream.

This step can be repeated once or several times, as required. A new charging with $H_2O_2$ after a first denitration stage can be eliminated if the waste gas from this stage still contains a sufficient amount of $H_2O_2$ which has not yet been utilized. The sorptive removal of the hydrogen nitrate $HNO_3$ formed after a preceeding catalytic reaction with $H_2O_2$ can take place by means of an absorption, e.g. in water or in dilute nitric acid.

A scrubbing column or tower is used for this step. However, it can also take place by means of a physical adsorption, e.g. on activated carbon or another suitable adsorption agent. Another possibility consists of a chemical reaction with a reactive solid such as, for example, lime.

A continued reduction of the $NO_x$ concentration is achieved by means of the single or multiple repeated catalytic treatment of the gas in the presence of gaseous hydrogen peroxide. However, since degrees of denitration of above 90% can be achieved even in the case of relatively dilute $NO_x$—containing gases (<1000 ppm $NO_x$) even with a single treatment of the described type, a multi-stage treatment is usually not necessary. However, the situation is quite different in the case of gases containing more concentrated amounts of $NO_x$. In this instance, a multi-stage treatment is often necessary, since as a result of the limited ability of the gas phase to be loaded with $H_2O_2$, which limitation is caused by the dew point, only an equivalent amount of the nitrogen oxides can be reacted to $HNO_3$.

The gaseous phase must accordingly be recharged with $H_2O_2$ and brought into contact again with one of the suggested catalysts in order to achieve the desired degree of denitration. If necessary, the $HNO_3$ stemming from the preceding reaction is entirely or partially removed from the gas phase before the recharging of the gas with $H_2O_2$.

The reaction heat occurring during the reaction can also require a stepwise performance of the reaction since problems can otherwise occur with the container material. The stepwise carrying out of the reaction can take place in fixed-bed reactors or in fluidized bed reactors containing one or more of the, for example, preferable described catalysts. Optionally, auxiliary agents can be used, for example, for improving the flowability or for pelletizing.

If liquid nitric acid is to be obtained as a useful substance, the gaseous $HNO_3/H_2O$ mixture formed in the method is depleted by means of scrubbing with water or preferably dilute nitric acid with a concentration above 10% by weight in the gas phase. The residual gas which is not absorbed in the scrubbing process is removed, optionally for further treatment.

As high a concentration as possible of the primarily accumulating acid is to be sought in the recovery of liquid nitric acid for reasons of better marketing and for a more economical subsequent concentration and/or purification. Therefore, the nitric acid can be recycled and functions as a receiver phase for $HNO_3$ present as gas and for $H_2O$.

The maximum obtainable concentration of nitric acid is the one which is adjusted by means of the evaporation equilibrium liquid nitric acid/gas phase. The water content and the $HNO_3$ content of the ga downstream of the reactor as well as the temperature at which the scrubbing stage is operated are of great significance.

Since the values of these parameters can be very different from case to case, no generally applicable statement can be made about the maximum obtainable concentration of the nitric acid circulating in the scrubber. However, the concentration can be calculated in the individual instance according to customary methods, given knowledge of the relevant values in the particular case.

In order to achieve a concentration of the nitric acid, the scrubbing liquid can be recycled, at which time the concentrated nitric acid is removed as needed.

In order to obtain a waste gas from the described method which is as clean as possible, the residual gas that is withdrawn after the $HNO_3$ was scrubbed out can be treated in accordance with a preferred embodiment of the method of the invention prior to being discharged into the atmosphere in a scrubbing stage with water or dilute nitric acid in a concentration up to 10% by weight.

The use of nitric acid of the highest possible concentration as the receiver phase for a $HNO_3/H_2O$ mixture which accumulates in a gaseous form has the consequence that the gas taken off from the absorption apparatus still contains $HNO_3$ in a concentration which results from the gas/liquid equilibrium.

It can be necessary to this end, in order to observe officially mandated conditions, to connect a subsequent, second scrubbing stage downstream which further reduces the emission of $HNO_3$. This second scrubbing stage is operated with water or nitric acid in a concentration up to 10% by weight. In order to prevent a too great concentration of $HNO_3$ from arising in this stage, fresh water must be introduced as required and a part of the circulation solution discharged. This discharged circulation solution, slightly charged with $HNO_3$, from the subsequently connected-in wash is supplied to the bottom of the preceding wash as scrubbing agent. This avoids the accumulation of nitrate-charged waste water from the subsequently connected-in scrubbing step.

The effectiveness of the method can generally be checked as follows:

A stream of model gas loaded with nitrogen oxides through a falling-film evaporator in which a continuously supplied, 50% by weight aqueous solution of hydrogen peroxide is completely vaporized in a concurrent flow with the stream of model gas. The maximum concentration of $H_2O_2$ in the model-gas stream is limited by the dew point of the gaseous hydrogen peroxide/water mixture at the temperature of the gas stream. Thus, $H_2O_2$ contents of up to approximately 2000 ppm $H_2O_2$ ($\approx$2790 mg $H_2O_2/m^3$) were achieved at a temperature of 20° C. and normal pressure. At higher temperatures, the absorption capacity of the model gas for $H_2O_2$ increases in accordance with its vapor-pressure curve.

The gas leaves the falling-film evaporator, heated to 70° C., and passes into the reactor. The catalyst is located there, preferably in the form of a fluidized bed consisting of a finely divided solid material which is inert in the reaction medium, which aids the reaction by virtue of a geometric and/or inner surface area or adsorption action which is greater in surface area in comparison to the reactor wall and which does not decompose $H_2O_2$ or does not significantly decompose it. Here, amounts of the catalyst were used which permit space velocities between 18 and 260 $m^3/h/kg$.*)

*) For applications in industrial scale generally space velocities up to 260 $m^3/h/kg$ and above may be used.

The nitrogen oxides are reacted catalytically with the hydrogen peroxide to form $HNO_3$ in the reactor, during which process this compound accumulates in a gaseous form, is taken up by the stream of model gas together with the water vapor stemming from the reaction of NO and is discharged out of the reactor.

If the gas is not to be further used as such, for example, for the production of fertilizers, it is then passed in the simplest instance directly into a scrubbing system for the generation of nitric acid. The $HNO_3$ content is washed out in this system with the aid of water or dilute nitric acid in a concentration above 10% by weight. This succeeds very readily because gaseous $HNO_3$ is readily soluble in aqueous media. Any non-reacted remnants of nitrogen oxides dissolve only very little in the scrubbing stage and therefore leave the system for an optional further workup. The waste gas can also still contain amounts of $HNO_3$ in a concentration which can be approximately indicated via the liquid/gas phase equilibrium of the scrubbing liquid.

The degrees of denitration achieved in a laboratory experiment are above 90% when using a silica gel as catalyst if the raw gas contains 720 ppm $NO_x$ and a concentration of 1200 ppm $H_2O_2$ is adjusted.

The method of a simple embodiment presented above in a general form can be set up as a first stage in a practical method for carrying out the invention. This stage would then include a) the addition and vaporization of peroxide, b) reaction of the peroxide with the nitrogen oxides in the catalytic fluid bed and c) an absorption of the gaseous $HNO_3$ formed in at least 10% by weight nitric acid. Very high degrees of denitration can be achieved with several stages of a) plus b) and a subsequent wash following c). Denitration can reach almost 100%.

The influence of the $NO_x$ amount contained in the gas to be treated is as follows:

| Conditions: | Model gas, Temperature: Gas stream: Catalyst: $H_2O_2$ 50% solution: | | fluidized bed reactor 25° C. 2.3 $Nm^3/h$ 30 g silica gel 60 0.08 ml/min. | | |
|---|---|---|---|---|---|
| Inlet, ppm | NO | 1625 | 875 | 470 | 250 | 20 |
| | $NO_x$ | 2250 | 1250 | 690 | 400 | 90 |
| | $NO_2$ | 625 | 375 | 220 | 150 | 70 |
| Outlet, ppm | NO | 650 | 200 | 20 | 0 | 0 |
| | $NO_x$ | 1500 | 875 | 70 | 35 | 25 |
| | $NO_2$ | 850 | 675 | 50 | 35 | 25 |
| Degree of denitration % | | 33.3 | 30.0 | 89.9 | 91.3 | 72.2 |

The amount of $NO_x$ removed decreases with decreasing concentration of $NO_x$ in the model gas. At the very low $NO_x$ content of 90 ppm, a degree of denitration of 72.2% is still achieved; however, the $H_2O_2$ supplied is no longer completely utilized. In the case of higher concentrations of $NO_x$ (2250 ppm and 1250 ppm), there is a deficiency of $H_2O_2$. The denitration was improved here by adding more $H_2O_2$; however, the dew point sets an upper limit in this instance.

The influence of the supply of $H_2O_2$ is as follows:

| Conditions: | Model gas, 250 ppm NO 400 ppm $NO_x$ Catalyst: Temperature: | fluidized bed reactor (150 ppm $NO_2$) 30 g silica gel 60 25° C. |
|---|---|---|

-continued

| | Gas stream: | | | | 2.3 Nm³/h | | |
|---|---|---|---|---|---|---|---|
| 50% solution of H₂O₂ ml/min. | | 0.08 | 0.06 | 0.04 | 0.035 | 0.03 | 0.025 | 0.02 |
| Clean gas ppm | NO | 0 | 2 | 6 | 9 | ~0 | ~0 | ~0 |
| | NO$_x$ | 35 | 35 | 35 | 38 | 160 | 260 | 350 |
| | NO$_2$ | 35 | 33 | 29 | 29 | 160 | 260 | 350 |
| Degree of Denitration % | | 91.3 | 91.3 | 91.3 | 90.5 | 60.0 | 35.0 | 12.5 |

It is clear from the data that an increase of the H$_2$O$_2$ supply is only logical if a certain lower limiting concentration of NO$_x$, influenced to a large extend by the structural conditions of the apparatus, (in the current instance approximately 30 ppm NO$_x$) had not already been reached in the clean gas.

The influence of the temperature is as follows:

| Conditions: | Model gas, Fluidized bed reactor 470 ppm NO 720 ppm NO$_x$ Catalyst: Gas stream: H$_2$O$_2$ 50% solution: | | | moistened with water, (250 ppm NO$_2$) 30 g silica gel 60 2.3 Nm³/h 0.08 ml/min. | | | |
|---|---|---|---|---|---|---|---|
| Reactor temperature, °C. | 25 | 40 | 55 | 80 | 95 | 110 | 130 |
| NO, ppm | 11 | 6 | 15 | 40 | 50 | 70 | 100 |
| NO$_x$, ppm | 62 | 66 | 76 | 100 | 130 | 180 | 240 |
| NO$_2$, ppm | 51 | 60 | 61 | 60 | 70 | 110 | 114 |
| Degree of Denitration % | 91.4 | 90.8 | 89.4 | 86.1 | 81.9 | 75 | 66.7 |

As the temperature rises, the degree of denitration deteriorates, slightly at first, then increasingly more sharply. This tendency could be counteracted by means of a greater amount of catalyst.

The influence of the amount of catalyst in the fluid bed is as follows:

| Conditions: | Model gas, 480 ppm NO 700 ppm NO$_x$ Catalyst: Temperature: Gas stream: H$_2$O$_2$ 50% solution: | | fluidized bed (220 ppm NO$_2$) silica gel 60 40° C. 1.6 Nm³/h 0.08 ml/min. | |
|---|---|---|---|---|
| Amount of catalyst, g | | | 15 | 30 | 60 |
| Clean gas, ppm | NO | 30 | 20 | 0 |
| | NO$_x$ | 110 | 70 | 30 |
| | NO$_2$ | 80 | 50 | 30 |
| Degree of Denitration, % | | | 84.3 | 90.0 | 95.7 |

Increasing of the quantity of catalyst at a given volume of gas stream flow to be treated (i.e. decreasing of the space velocity) brings about an increased conversion of the nitrogen oxides to HNO$_3$.

Further conceivable influencing variables on the conversion, such as the moisture of the raw gas (potential competing adsorption of H$_2$O$_2$/NO/NO$_2$ with H$_2$O) or the additional presence of SO$_2$ as well as both influencing variables together, have been investigated in experiments.

After the humidifying of the model gas, a somewhat reduced denitration effect occurred. However, high degrees of denitration continue to be present (see examples).

In the case of a humidifed model gas containing SO$_2$ in addition, no lesser denitration effect occurred than in the case of dry model gas free of SO$_2$ (see examples).

However, the SO$_2$ was completely reacted to SO$_3$. As a consequence, SO$_3$ aerosols formed above the catalyst (silica gel 60). The color of the catalyst changed during operation after the start of the addition of H$_2$O$_2$ from white to orange, whereas by way of contrast in the case of dry model gas free of SO$_2$, a color change from white to yellow took place.

The method of the present invention has the following advantages:

1. It can be used at temperatures below 100° C. and can thus be operated as a denitration stage connected downstream of a wet method for desulfurization and for purifying cold process gases.

The method generates, with gaseous HNO$_3$ or with liquid nitric acid, a utilizable substance from the nitrogen oxides.

2. The dimensions of the HNO$_3$ absorber can be kept relatively small since, according to the invention, the nitrogen oxides are reacted catalytically to the compound HNO$_3$, which is readily soluble in aqueous media, without being brought beforehand into a liquid phase.

3. As a consequence of the use of hydrogen peroxide, which is particularly compatible with the environment, the method is free of additional emissions of pollutants caused e.g. in the SCR or SNCR methods.

4. The method is distinguished by the use of especially economical catalysts which are, in addition, not sensitive to so-called catalytic poisons, since their effectiveness is assured by their large surface and not by relatively few active centers.

5. The method is also suitable for very small emission sources because of the low capital expenditure required and its simple design.

6. The method achieves degrees of denitration of above 90% with a one-stage operation even in the case of small concentrations of NO$_x$. If several stages are used, an almost complete removal of NO$_x$ can be realized.

7. The desired degree of denitration can be readily adjusted by way of the amount of hydrogen peroxide added.

8. The method operates completely without waste water and refuse. No residual substances requiring disposal accumulate.

EXAMPLES

The invention is explained further in the following using examples of embodiments with different catalysts. Example 1 contains a description of the apparatus used in all examples.

Example 1

A model gas is produced by mixing compressed air and a slight amount of NO gas taken from gas bottle 1 and is conducted through mixing stretch 2 into falling film evaporator 6 (material: glass). The volume flow is 2.3 Nm³/h. It is indicated by float flow meter 4. The model gas is analyzed for its content of NO and $NO_x$ as required after the opening of valve 3 with a commercially $NO_x$ analyzing device 5 (chemiluminescence principle). The difference of the concentration of $NO_x$ and of NO yields the concentration of $NO_2$. The $NO_2$ is formed by air oxidation from NO.

During its passage through the falling film evaporator, the model gas is charged with a defined amount of vaporized solution of $H_2O_2$. Automatic dosing device 7 is used for this, with which a 50% aqueous solution of hydrogen peroxide is continuously fed onto the evaporation surface of the falling film evaporator around which the model gas flows. The evaporation surface is heated with warm water controlled by a thermostat to 80° C. The dosed solution of $H_2O_2$ runs in at a dosing rate of 0.08 ml/min. onto the upper end of the evaporation surface and flows down on it under the influence of gravity. During its downward travel, the solution of $H_2O_2$ evaporates completely, is taken up by the model gas and carried along with it.

The gas current charged in this manner with solution of $H_2O_2$ passes into fluid-bed reactor 9 (material: glass), which contains the catalyst (60 g silica gel 60, particle size 0.2-0.5 mm, item 7733 of the Merck company, Darmstadt).

The reactor is conically designed. The empty tube velocity of the gas is 0.33 m/s in the lower part with the smallest cross section. The reactor is equipped with a thermometer.

Following reactor 9, the reacted gas mixture is conducted into a filler column 10 (material: glass, diameter 4 cm, length, 40 cm, packing: Raschig rings 2×4 mm, cocurrent operation). The $HNO_3$ formed in the reactor is absorbed here at room temperature with recycled water which is gradually converted into dilute $HNO_3$. The non-reacted nitrogen-oxide component goes into solution only to a negligible extent there because of poor solubility. The recycled flow of liquid is 1.2 l/min. A partial stream of gas exiting from scrubbing column 10 is analyzed with $NO_x$ analyzer 5 for its residual content of nitrogen oxides.

Conditions:
Model gas: 480 ppm NO and 680 ppm $NO_x$
(200 ppm $NO_2$) at 2.3 $Nm^3/h$
Temperature in the reactor: 40° C.
Total pressure: 1 bar
The concentrations in the withdrawn gas are:
Without addition of solution of $H_2O_2$ in 6: 430 ppm NO and 630 ppm $NO_x$ (200 ppm $NO_2$);
With addition of 0.08 ml/min. $H_2O_2$, 50% solution in 6:
0 ppm NO and 30 ppm $NO_x$ (30 ppm $NO_2$).
These final concentrations are achieved 10 minutes after the start of the dosing in of $H_2O_2$. The silica gel, which was previously white, assumes a yellowish color during the course of this time.
Degree of denitration: 95.6%.

Example 2

The method of operation corresponds to that of Example 1 but with modified concentration of $NO_x$ of the model gas (700 ppm NO and 1000 ppm $NO_x$ (300 ppm $NO_2$) and with a dosing rate of 0.12 ml/min. solution of $H_2O_2$) into falling film evaporator 6 as well as with the use of 50% nitric acid as absorption solution in 10.

After the addition of 0.12 ml/min. $H_2O_2$ (50% solution) in 6, the concentrations in the withdrawn gas are:
0 ppm NO and 460 ppm $NO_x$ (460 ppm $NO_2$).

The blind (control) test with model gas free of $NO_x$ and without the addition of $H_2O_2$ resulted in a signal of 0 ppm NO and 380 ppm $NO_x$ (380 ppm $NO_2$) in the withdrawn gas as a consequence of the vapor pressure of the 50% nitric acid.

Degree of denitration: 92% ($HNO_3$ vapor pressure taken into consideration).

Example 3

As in Example 1 but with a different concentration of $NO_x$ of the model gas (210 ppm NO and 350 ppm $NO_x$ (140 ppm $NO_2$)), a catalytic amount of 30 g silica gel and with a temperature of 25° C. and a dosing rate of 0.02 ml/min. solution of $H_2O_2$.

The withdrawn gas contains:
Without addition of solution of $H_2O_2$ in 6: 180 ppm NO and 320 ppm $NO_x$ (140 ppm $NO_2$);
With addition of 0.02 ml/min. 50% solution of $H_2O_2$ in 6:
8 ppm NO and 28 ppm $NO_x$ (20 ppm $NO_2$).
Degree of denitration: 92%.

Example 4

Like Example 1 but the apparatus additionally contains a falling film evaporator which is identical in design to falling film evaporator 6 but connected in front of it and into which 0.3 ml/min. water are dosed for humidifying the model gas. The temperature in the reactor is 65° C. and the solution of $H_2O_2$ is added at 0.12 ml/min.

The concentrations in the withdrawn gas are:
Without addition of solution of $H_2O_2$ in 6: 420 pp NO and 640 ppm $NO_x$ (220 ppm $NO_2$);
With addition of 0.12 ml/min. 50% solution of $H_2O_2$ in 6:
20 ppm NO and 60 ppm $NO_x$ (40 ppm $NO_2$).

These final concentrations are achieved 30 min. after the start of the dosing of $H_2O_2$. Condensation drops form over the catalyst but do not disturb the operation of the fluid bed.
25 Degree of denitration: 91.2%.

Example 5

Like Example 4 but $SO_2$ gas is additionally supplied to the model gas corresponding with the addition of NO from gas bottle 1. (Model gas: 400 ppm NO and 720 ppm $NO_x$ (320 ppm $NO_2$) as well as 130 ppm $SO_2$ at 1.15 $Nm^3/h$). The temperature in the reactor is 40° C. and the volume flow of the model gas is 1.15 $Nm^3/h$. The solution of $H_2O_2$ is fed into evaporator 6 at 0.08 ml/min.

The withdrawn gas contains:
Without addition of $H_2O_2$ in 6: 220 ppm NO and 680 ppm $NO_x$ (460 ppm $NO_2$) and 75 ppm $SO_2$;
With addition of 0.08 ml/min. 50% solution of $H_2O_2$ in 6:
2 ppm NO and 55 ppm $NO_x$ (53 ppm $NO_2$ and ~0 ppm $SO_2$.

These final concentrations are achieved after a few minutes as regards $SO_2$ and after one hour as regards NO and $NO_2$. The silica gel changes its color from white to orange.
Degree of denitration: 92.4%.

Example 6

Like Example 1 but the gas (model gas: humidified, 480 ppm NO and 720 ppm $NO_x$ (240 ppm $NO_2$)) is humidified as in Example 4 with water and 30 g catalyst (silica gel 60) are added. The reactor is operated at different temperatures (25° C., 80° C., 110° C. and 130° C.) which are adjusted with electric strip heaters.

The withdrawn gas contains:
Without addition of solution of $H_2O_2$ in 6: 410 ppm NO and 600 ppm $NO_x$ (190 ppm $NO_2$);
With addition of 0.08 ml/min. 50% solution of $H_2O_2$ in 6:
11 ppm NO and 62 ppm $NO_x$ (51 pm $NO_2$) at 25° C. reactor temperature, and
40 ppm NO and 100 ppm $NO_x$ (60 ppm $NO_2$) at 80° C., and
70 ppm NO and 180 ppm $NO_x$ (110 ppm $NO_2$) at 110° C., and
100 ppm NO and 240 ppm $NO_x$ (140 ppm $NO_2$) at 130° C.

These final concentrations are achieved on the average 40 min. after the start of the dosing of $H_2O_2$.

Degree of denitration:
91.4% at 25° C.
86.1% at 80° C.
75.0% at 110° C.
66.7% at 130° C.

Example 7 a) Like Example 1; however, the described system is followed in succession by a further falling film evaporator identical in design to 6 and with automatic dosing device, by a further fluidized bed reactor identical in design to 9 which likewise contains 60 g silica gel and by a further filler column identical in design to 10 which is operated in countercurrent.

These additional apparatus are used for a second treatment stage. Filler column 10 of the first treatment stage is used here for the intermediate absorption of $HNO_3$ from the gas phase. The content of NO and of $NO_x$ is again determined both after filler column 10 and also from the gas withdrawn from the total system.

Conditions, in deviation from Example 1:
Catalyst 2×60 g silica gel 60
Model-gas current: 480 ppm NO and 750 ppm $NO_x$ (270 ppm $NO_2$) at 1.5 $Nm^3/h$.

The withdrawn gas has:
Without addition of $H_2O_2$ into one of the two evaporators, a content of:
~420 ppm NO and 710 ppm $NO_x$ (290 ppm $NO_2$);
With addition of 0.08 ml/min. 50% solution of $H_2O_2$ into evaporator 6 (1st stage), a content of:
12 ppm NO and 68 ppm $NO_x$ (56 ppm $NO_2$);
With the additional addition of 0.02 ml/min. 50% solution of $H_2O_2$ into the evaporator of the 2nd stage following the 1st treatment stage:
1 ppm NO and 18 ppm $NO_x$ (17 ppm $NO_2$).

Degree of denitration:
90.0% (stage 1)
73.5% (stage 2)
97.6% (total).

b) Like Example 7a; however, the apparatus is additionally provided with a filler column operated with water of 25° C. The latter is located directly upstream of evaporator 6 and serves to humidify the model gas. Moreover, there is no intermediate absorption of $HNO_3$ after the 1st stage. Rather, the gas stream is conducted from the 1st reactor directly into the falling film evaporator of the 2nd stage, into which, however, no solution of $H_2O_2$ is dosed.

The withdrawn gas contains, upon the addition of 0.1 ml/min. 50% solution of $H_2O_2$:
~0 ppm NO and 15 ppm $NO_x$ (15 ppm $NO_2$).
Degree of denitration: 98% (total).

Example 8

Like Example 1 but with another catalyst and gas current reduced to 0.54 $Nm^3/h$. Instead of compressed air, room air is sucked through the apparatus with the gas pump belonging to the $NO_x$ analyzer Conditions, in deviation from Example 1:
Catalyst 10 g silica gel 60 H silanized (item 7761 of the Merck company, Darmstadt)
Model gas: 300 ppm NO and 520 ppm $NO_x$ (220 ppm $NO_2$) at 0.54 $Nm^3/h$ external air as carrier gas.

The concentrations in the withdrawn gas are:
Without addition of solution of $H_2O_2$ in 6: 270 ppm NO and 490 ppm $NO_x$ (220 ppm $NO_2$);
With addition of 0.024 ml/min. 50% solution of $H_2O_2$ in 6:
~0 ppm NO and 30 ppm $NO_x$ (30 ppm $NO_2$).
Degree of denitration: 94.2%

Example 9

Like Example 1 but with another catalyst and at a temperature of 65° C. in the reactor.

Other conditions, in deviation from Example 1:
Catalyst: 10 g H mordenite (pore diameter 6.7×7.0 Å, modulus 18 (Si/Al =9) in granulated form, particle size 0.3–0.9 mm
Model gas: 550 ppm NO and 790 ppm $NO_x$ (240 ppm $NO_2$) at 2.3 $Nm^3/h$.

The withdrawn gas contains:
Without addition of $H_2O_2$ in 6: 440 ppm NO and 720 ppm $NO_x$ (280 ppm $NO_2$);
With addition of 0.08 ml/min. 50% solution of $H_2H_2$ in 6:
40 ppm NO and 210 ppm $NO_x$ (170 ppm $NO_2$).
Degree of denitration: 73.4%.

Example 10

Like Example 1 but with reduced flow of model gas and another catalyst.

Conditions, in deviation from Example 1:
Catalyst Zeolite ZSM-5 (pore diameter 5.4–5.6 Å, modulus 42 (Si/Al =21) in granulated form, particle size 0.3–0.9 mm
Model gas: 490 ppm NO and 700 ppm $NO_x$ (210 ppm $NO_2$) at 1.58 $Nm^3/h$.

The withdrawn gas contains:
Without addition of solution of $H_2O_2$ in 6: 370 ppm NO and 590 ppm $NO_x$ (220 ppm $NO_2$);
With addition of 0.08 ml/min. 50% solution of $H_2O_2$ in 6:
~0 ppm NO and 120 ppm $NO_x$ (120 ppm $NO_2$).
Degree of denitration: 82.9%.

b) Like Example 10 a but with another catalyst.
Conditions, in deviation from Example 10 a:
Catalyst: 20 g ion-exchange resin, macroporous, sharply acidic (Amberlyst 15, item 15 635 of the Merck company, Darmstadt), particle size 0.3–0.9 mm.

The withdrawn gas contains:
Without addition of solution of $H_2O_2$ in 6: 390 ppm NO and 540 ppm $NO_x$ (150 ppm $NO_2$);

With addition of 0.08 ml/min. 50% solution of $H_2O_2$ in 6:
40 ppm NO and 150 ppm $NO_x$ (110 ppm $NO_2$).
Degree of denitration: 76.6%.

Example 11 a) Like Example 8 but with another catalyst.
Conditions, in deviation from Example 8:
Catalyst: 10 g H talcum powder, commercial product
Model gas: 350 ppm NO and 580 ppm $NO_x$ (230 ppm $NO_2$).
The withdrawn gas contains:
Without addition of solution of $H_2O_2$ in 6: 310 ppm NO and 530 ppm $NO_x$ (230 ppm $NO_2$);
With addition of 0.024 ml/min. 50% solution of $H_2O_2$ in 6:
20 ppm NO and 210 ppm $NO_x$ (190 ppm $NO_2$).
Degree of denitration: 63.8%.

b) Like Example 11 a but with another catalyst.
Conditions, in deviation from example 11 a:
Catalyst: 10 g diatomaceous earth, commercial product (item 8117 of the Merck company, Darmstadt).
The withdrawn gas contains:
Without addition of solution of $H_2O_2$ in 6: 290 ppm NO and 530 ppm $NO_x$ (140 ppm $NO_2$);
With addition of 0.024 ml/min. 50% solution of $H_2O_2$ in 6:
10 ppm NO and 200 ppm $NO_x$ (190 ppm $NO_2$).
Degree of denitration: 65.5%.

c) Like Example 11a but with another catalyst.
Conditions, in deviation from Example 11a:
Catalyst: 30 g Aluminum oxide powder (aluminum oxide 90, item 1078 of the Merck company, Darmstadt).
The withdrawn gas contains, with the addition of 0.024 ml/min. 50% solution of $H_2O_2$ in 6:
~0 ppm NO and 43 ppm $NO_x$ (43 ppm $NO_2$).
Degree of denitration: 92.6%.

d) Like Example 11a but with another catalyst.
Conditions, in deviation from Example 11a:
Catalyst: 30 g H titanium dioxide powder (item 812 of the Merck company, Darmstadt).
The withdrawn gas contains, with the addition of 0.024 ml/min. 50% solution of $H_2O_2$ in 6:
~0 ppm NO and 55 ppm $NO_x$ (55 ppm $NO_2$).
Degree of denitration: 90.5%.

Example 12

Like Example 1 but with another catalyst and reduced current of model gas.
Conditions, in deviation from Example 1:
Catalyst: 55 g material containing laminated silicate (Catsan hygienic litter, Effem company, Verden), granulated, particle size <1 mm
Model gas: 500 ppm NO and 700 ppm $NO_x$ (200 ppm $NO_2$) at 1.58 $Nm^3/h$.
The withdrawn gas contains:
Without addition of solution of $H_2O_2$ in 6: 490 ppm NO and 550 ppm $NO_x$ (60 ppm $NO_2$);
With addition of 0.08 ml/min. 50% solution of $H_2O_2$ in 6:
2 ppm NO and 45 ppm $NO_x$ (43 ppm $NO_2$).
The final values with the addition of $H_2O_2$ are achieved after 60 minutes.
Degree of denitration: 93.6%.

Example 13

Like Example 1, however, instead of fluidized bed reactor 9, a tube reactor (material: glass, diameter 3 cm) with catalytic fixed bed is used. A temperature of 65° C. prevails in the reactor and the model gas current is 2.0 $Nm^3/h$.
Other conditions, in deviation from Example 1:
Catalyst: 7.5 g activated carbon, extruded pieces 2.4×4 mm (specific surface 1270 $m^2/g$) (activated-carbon carrier 120, Degussa company, Frankfurt)
Model gas stream: 480 ppm NO and 720 ppm $NO_x$ (240 ppm $NO_2$) at 2.0 $Nm^3/h$.
The withdrawn gas contains:
Without addition of solution of $H_2O_2$ in 6: 440 ppm NO and 640 ppm $NO_x$ (200 ppm $NO_2$);
With addition of 0.08 ml/min. 50% solution of $H_2O_2$ in 6: 40 ppm NO and 410 ppm $NO_x$ (370 ppm $NO_2$).
Degree of denitration: 43.1%.

Example 14 a) Like Example 13 but with another catalyst.
Conditions, in deviation from Example 13:
Catalyst: 30 g Zeolite H-mordenite, extruded pieces 4×7 mm, (pore diameter 6.7×7.0 Å, modulus 18 (Si/Al=9)
Temperature: 65° C.
Model gas stream: 510 ppm NO and 750 ppm $NO_x$ (240 ppm $NO_2$) at 2.0 $Nm^3/h$.
The withdrawn gas contains:
Without addition of solution of $H_2O_2$ in 6: 410 ppm NO and 650 ppm $NO_x$ (240 ppm $NO_2$);
With addition of 0.08 ml/min. 50% solution of $H_2O_2$ in 6:
20 ppm NO and 200 ppm $NO_x$ (180 ppm $NO_2$).
Degree of denitration: 73.3%.

b) Like Example 13 but with elevated temperature.
Conditions, in deviation from Example 13:
Temperature: 100° C.
The withdrawn gas contains, with the addition of 0.08 ml/min. 50% solution of $H_2O_2$ in 6:
0 ppm NO and 210 ppm $NO_x$ (210 ppm $NO_2$).
Degree of denitration: 72%.

Further variations and modifications of the foregoing will be apparent to those skilled in the art and are intended to be encompassed by the claims appended hereto.

German application P 40 15 284.7-43 is relied on and incorporated herein.

We claim:

1. A method for the removal of nitrogen oxides from waste gases, comprising: determining the content of nitrogen oxides of the waste gas, treating the waste gas with a solution of hydrogen peroxide converted into the gaseous state in an amount which is adapted to the amount of nitrogen oxides in said waste gas to be removed and is at least stoichiometrically sufficient for the reaction equations:

$$2 NO + 3 H_2O_2 \rightarrow 2 HNO_3 + 2 H_2O$$

and $$2 NO_2 + H_2O_2 \rightarrow 2 HNO_3,$$

to thereby obtain a gaseous reaction mixture containing the nitrogen oxides and the hydrogen peroxide, reacting the gaseous mixture on a solid catalyst which can absorb at least $H_2O_2$ but which does not excessively decompose the hydrogen peroxide, and thereafter withdrawing the reacted gaseous mixture.

2. The method according to claim 1 wherein waste gases are treated that are obtained from industrial furnaces or from combustion systems.

3. The method according to claim 1 wherein an excess of $H_2O_2$ is used.

4. The method according to claim 1 wherein the gaseous reaction mixture is reacted at its temperature or with an adjustment of the gaseous mixture temperature into the range of 20° to 120° C.

5. The method according to claim 1 wherein the solid catalyst is used in an amount to insure a space velocity up to 260 $m^3/h/kg$.

6. The method according to claim 1 wherein the amount of gaseous $NHO_3/H_2O$ mixture formed is processed further to form nitric acid.

7. The method according to claim 1, further comprising carrying out the reaction in a fluidized bed or fixed bed of the catalyst.

8. The method according to claim 1 wherein said catalyst is a member of the group:
  a) as fine or granulated substances:
    silica gels, precipitated silicas, pyrogenic silicas, optionally in hydrophobic form;
    wide-pore or medium-pore natural or synthetic zeolites;
    ion-exchange resins with porous structure;
    phyllosilicates;
    diatomaceous earth;
    aluminum oxide;
    titanium dioxide;
    natural or synthetic laminated silicates;
    activated carbons;
  b) microglass spheres
    quartz sand;
    calcium sulfate hydrate powder, optionally as granulate
    narrow-pore zeolites, optionally as a granulate;
  c) builder's sand; and
    iron oxide,
    and mixtures thereof.

9. The method according to claim 1 further comprising bringing aqueous hydrogen peroxide in a concentration up to 85% by weight in the required measured amount for evaporation into a stream of waste gas.

10. The method according to claim 9 wherein the aqueous hydrogen peroxide is sprayed or atomized into the stream of waste gas.

11. The method according to claim 9 wherein the aqueous hydrogen peroxide is evaporated by means of an external evaporator of an evaporator arranged in the stream of waste gas.

12. The method according to claim 11 wherein a falling-film evaporator is used, with adjustment of the evaporation amounts via the amount of $H_2O_2$ solution supplied to the evaporator.

13. The method according to claim 1 further comprising reacting the gas mixture on the catalyst a plurality of times.

14. The method according to claim 13 wherein an additional amount of $H_2O_2$ is used.

15. The method according to claim 13 wherein the $HNO_3$ contained in the gaseous reaction mixture is sorptively removed.

16. The method according to claim 1 further comprising scrubbing said gaseous $HNO_3/H_2O$ mixture formed by means of scrubbing with water or optionally dilute nitric acid with a concentration above 10% by weight in the gas phase and the residual gas which was not absorbed in the scrubbing process is removed.

17. The method according to claim 16, further comprising recycling the scrubbing liquid for enriching the nitric acid and removing concentrated nitric acid.

18. The method according to claim 16 further comprising treating withdrawn residual gas before discharging into the atmosphere in a scrubbing stage with water or dilute nitric acid with a concentration up to 10% by weight.

* * * * *